(12) United States Patent
Hess et al.

(10) Patent No.: US 11,080,530 B2
(45) Date of Patent: Aug. 3, 2021

(54) METHOD AND SYSTEM FOR DETECTING AN ELEVATED OBJECT SITUATED WITHIN A PARKING FACILITY

(71) Applicant: Robert Bosch GmbH, Stuttgart (DE)

(72) Inventors: Felix Hess, Benningen (DE); Andreas Lehn, Ludwigsburg (DE); Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 54 days.

(21) Appl. No.: 16/461,953

(22) PCT Filed: Oct. 9, 2017

(86) PCT No.: PCT/EP2017/075608
§ 371 (c)(1),
(2) Date: May 17, 2019

(87) PCT Pub. No.: WO2018/095640
PCT Pub. Date: May 31, 2018

(65) Prior Publication Data
US 2019/0325225 A1 Oct. 24, 2019

(30) Foreign Application Priority Data
Nov. 23, 2016 (DE) .......................... 102016223106.5

(51) Int. Cl.
*G06K 9/00* (2006.01)
*G06K 9/20* (2006.01)
(Continued)

(52) U.S. Cl.
CPC ..... *G06K 9/00718* (2013.01); *G06K 9/00651* (2013.01); *G06K 9/20* (2013.01);
(Continued)

(58) Field of Classification Search
CPC .. G06K 9/00718; G06K 9/00651; G06K 9/20; G06K 9/6202; G06K 2009/2045;
(Continued)

(56) References Cited

U.S. PATENT DOCUMENTS

| 2010/0258107 | A1 | 10/2010 | Davidson et al. |
| 2011/0058041 | A1* | 3/2011 | Kister ................... B61L 23/00 |
| | | | 348/149 |

(Continued)

FOREIGN PATENT DOCUMENTS

| DE | 102014205180 A1 | 9/2015 |
| DE | 102014008578 A1 | 12/2015 |

(Continued)

OTHER PUBLICATIONS

International Search Report for PCT/EP2017/075608, dated Jan. 22, 2018.

*Primary Examiner* — Qian Yang
(74) *Attorney, Agent, or Firm* — Norton Rose Fulbright US LLP; Gerard Messina (57) ABSTRACT

A method for detecting an elevated object situated within a parking facility, using at least two video cameras that are spatially distributed within the parking facility and whose visual ranges overlap in an overlap area. The method encompasses the following: recording particular video images of the overlap area with the aid of the video cameras; analyzing the recorded video images in order to detect an elevated object in the recorded video images, and ascertaining, based on the recorded video images, whether in the detection of an elevated object the detected elevated object is real. A corresponding system, a parking facility, and a computer program are also provided.

11 Claims, 3 Drawing Sheets

(51) Int. Cl.
*G06K 9/62* (2006.01)
*H04N 5/247* (2006.01)

(52) U.S. Cl.
CPC .......... *G06K 9/6202* (2013.01); *H04N 5/247* (2013.01); *G06K 2009/2045* (2013.01)

(58) Field of Classification Search
CPC ........ H04N 5/247; G08G 1/052; G08G 1/097; G08G 1/04; G08G 1/015
See application file for complete search history.

(56) References Cited

U.S. PATENT DOCUMENTS

| | | |
|---|---|---|
| 2014/0036076 A1 | 2/2014 | Nerayoff et al. |
| 2014/0257943 A1 | 9/2014 | Nerayoff et al. |
| 2014/0343842 A1* | 11/2014 | Ranganathan ......... G01C 21/30 701/472 |
| 2015/0339924 A1 | 11/2015 | Cook et al. |
| 2016/0321929 A1 | 11/2016 | Nordbruch et al. |

FOREIGN PATENT DOCUMENTS

| | | |
|---|---|---|
| DE | 102014221682 A1 | 4/2016 |
| DE | 102015201209 A1 | 7/2016 |
| EP | 2372627 A2 | 10/2011 |
| JP | 2000115810 A | 4/2000 |
| JP | 2003232867 A | 8/2003 |
| JP | 2016024676 A | 2/2016 |
| JP | 2016057677 A | 4/2016 |
| JP | 2016099953 A | 5/2016 |

* cited by examiner

METHOD AND SYSTEM FOR DETECTING AN ELEVATED OBJECT SITUATED WITHIN A PARKING FACILITY

FIELD

The present invention relates to a method for detecting an elevated object situated within a parking facility, for example a parking deck, in particular within a driving path of a parking facility. Moreover, the present invention relates to a system for detecting an elevated object situated within a parking facility, for example a parking deck, in particular within a driving path of a parking facility. Moreover, the present invention relates to a parking facility. Furthermore, the present invention relates to a computer program.

BACKGROUND INFORMATION

German Patent Application No. DE 10 2015 201 209 A1 describes a valet parking system for automatically bringing a vehicle from a handover zone to an assigned parking space within a predefined parking area. The conventional system encompasses a parking facility monitoring system with at least one stationary sensor unit. The parking facility monitoring system is designed to locate the vehicles traveling within the predefined parking area.

SUMMARY

An object of the present invention is to provide for efficiently detecting an elevated object situated within a parking facility, for example a parking deck, in particular within a driving path of a parking facility.

This object may be achieved via the present invention.

Advantageous embodiments of the present invention are described herein.

According to one aspect of the present invention, a method for detecting an elevated object situated within a parking facility, using at least two video cameras that are spatially distributed within the parking facility and whose visual ranges overlap in an overlap area, is provided, including the following steps:
a) recording particular video images of the overlap area with the aid of the video cameras,
b) analyzing the recorded video images in order to detect an elevated object in the recorded video images,
c) ascertaining, based on the recorded video images, whether in the detection of an elevated object the detected elevated object is real.

According to another aspect of the present invention, a system for detecting an elevated object situated within a parking facility is provided, the system being designed for carrying out the method for detecting an elevated object situated within a parking facility.

According to another aspect of the present invention, a parking facility is provided that encompasses the system for detecting an elevated object situated within a parking facility.

According to yet another aspect of the present invention, a computer program is provided that includes program code for carrying out the method for detecting an elevated object situated within a parking facility, when the computer program is executed on a computer.

The present invention is based on the finding that the above object may be achieved by checking, based on video images recorded in chronological succession, whether or not an initially detected elevated object is real. This means in particular that a result that has been ascertained based on the initially recorded video images (the result indicating that an elevated object has been detected) is verified or checked by tracking the initially detected object over time. In particular, the initially detected object may thus be efficiently checked for plausibility. This is because it is generally not possible, for example, for an object to suddenly disappear. The object, provided that it is actually real, should be detected also during an analysis of video images that have been recorded subsequent to the video image in which the object was initially detected, and at that location should have, for example, the same properties as before.

This means in particular that, based on particular evaluations of video images that are recorded in each case in chronological succession, it is checked whether a recognized, i.e., detected, object is real, i.e., whether the object is even possible or realistic.

This yields the technical advantage, for example, that false alarms may be reduced or avoided, which advantageously allows efficient operation of the parking facility, and for example, efficient operation of driverless motor vehicles traveling within the parking facility.

This yields the technical advantage, for example, that objects may be efficiently recognized so that a collision with such objects may be prevented.

This yields the technical advantage that a concept for efficiently detecting an elevated object situated within a parking facility may be provided.

According to one specific embodiment of the present invention, it is provided that for detecting an elevated object in the recorded video images, the following steps are provided according to the analysis according to step b):
 rectifying the recorded video images,
 comparing the particular rectified video images to one another in order to recognize a difference in the recorded overlap areas,
 detecting an elevated object based on the comparison.

Prior to a comparison of the video images, it is provided in particular that the video images are transformed, i.e., rectified. The rectified video images are then compared to one another.

When all rectified video images of the overlap area show no differences, for example, i.e., are the same or identical, or differ maximally by a predetermined tolerance value, it may be assumed that no elevated object is situated on the particular visual axis between the overlap area and the video cameras. In this regard, no elevated object is detected. Thus, in particular a result is ascertained which indicates that no elevated object has been detected.

However, if an elevated object is situated on a visual axis between the overlap area and one of the video cameras, this one video camera does not have the same view as the other video cameras. The rectified video image in question will thus differ from the rectified video image of the other video cameras by an amount that is greater than the predetermined tolerance value. In this regard, an elevated object is then detected. Thus, in particular a result is ascertained which indicates that an elevated object has been detected.

An elevated object may thus be efficiently detected with the aid of the at least two video cameras.

Within the meaning of the description, a parking facility is in particular a parking facility for motor vehicles. The parking facility is a parking deck or a parking garage, for example. An object to be detected is situated, for example, within a driving path of the parking facility.

An elevated object refers in particular to an object whose height relative to a floor of the parking facility is at least 10 cm.

The elevated object is situated, for example, on a floor of the parking facility, for example on a driving surface or within a travel area, for example within a driving path, of the parking facility. The elevated object is thus situated, for example, within a driving path of the parking facility.

A rectification of the recorded video images in particular encompasses or is, for example, a transformation of the recorded video images into the bird's-eye view. This means in particular that the recorded video images are transformed into the bird's-eye view, for example. The subsequent comparison may thus be advantageously carried out in a particularly efficient manner.

Within the meaning of this description, the phrases "same image information" and "identical image information", or "same video images" and "identical video images", in particular also encompass the case that the pieces of image information or the video images have a maximum difference that is within a predetermined tolerance value. Only differences that are greater than the predetermined tolerance value result in a detection of an object. This means in particular that small differences in the brightness information and/or color information are allowed in order to draw the conclusion that the pieces of image information or the video images are the same or identical, provided that the differences are less than the predetermined tolerance value.

This means in particular that, for example, an elevated object is detected only when, for example, the video images differ by an amount that is greater than the predetermined tolerance value. This means in particular that an elevated object is detected only when, for example, one overlap area differs from the other overlap areas by an amount that is greater than the predetermined tolerance value.

In one specific embodiment, it is provided that step c) encompasses ascertaining an object speed, the ascertained object speed being compared to a predetermined object speed threshold value, and based on the comparison it being determined whether the detected elevated object is real.

This yields the technical advantage, for example, that it may be efficiently determined whether the detected elevated object is real. This is because certain speeds are generally expected for real objects within a parking facility. For example, an object speed of 150 km/h is not plausible. In this case, the detected object is not real.

This means in particular that it is determined that the detected elevated object is real when the ascertained object speed is less than or less than or equal to the predetermined object speed threshold value, it being determined that the detected elevated object is not real when the ascertained object speed is greater than or greater than or equal to the predetermined object speed threshold value.

An object speed threshold value is, for example, 60 km/h, for example 50 km/h, in particular 40 km/h.

This specific embodiment is thus based on the finding that objects within the parking facility are generally able to move only at a certain maximum speed.

According to one specific embodiment, it is provided that step c) encompasses ascertaining a movement of the detected elevated object, it being ascertained whether the movement of the detected elevated object is plausible, and based on the plausibility check it being determined whether the detected elevated object is real.

This yields the technical advantage, for example, that it may be efficiently determined whether the detected elevated object is real. This is because certain movements are generally expected for real objects within a parking facility. Objects in the size range of a motor vehicle cannot move vertically upward or change their direction by 90° on the spot. Such conclusions cannot be drawn for smaller objects, since, for example, people can jump into the air. Ascertaining the plausibility of the movement is carried out, for example, as a function of the size of the detected object. Objects within the size range of a motor vehicle are subject, for example, to the above-described limitations in movement.

In one specific embodiment, step c) encompasses ascertaining whether, and if so, at which location in the video images, the detected elevated object moves into the particular video image and/or moves out of the particular video image. In particular, it is determined that the detected elevated object is real when the detected object moves into the particular video image at the edge as the location, and/or moves out of the particular video image at the edge as the location. In particular, it is determined that the detected elevated object is not real when the detected object appears within the video image or disappears within the video image without having crossed the edge of the video image.

This specific embodiment is based on the finding that elevated objects can move into a scene (in the present case, the video images) only across the edge of the scene, and/or can leave the scene again only across the edge. In the middle of a scene, i.e., within the scene, an object cannot simply appear or emerge and/or disappear.

This yields the technical advantage, for example, that it may be efficiently determined whether the detected elevated object is real.

According to one specific embodiment, it is provided that step c) encompasses classifying the detected elevated object, it being determined, based on the classification, whether the detected elevated object is real.

This yields the technical advantage, for example, that it may be efficiently determined whether the detected elevated object is real. This is because generally only certain objects are expected within a parking facility. In addition, the knowledge of the type of object may be efficiently utilized for determining whether the detected object is real.

Step c) encompasses, for example, checking whether the classification changes over time, the determination of whether the object is real being carried out based on this check. It is determined that the object is not real in particular when a change is ascertained. It is determined that the object is real in particular when no change is ascertained.

The classification encompasses, for example, ascertaining a size, in particular a length and/or a height and/or a width, of the detected object.

According to one specific embodiment, it is provided that step c) encompasses ascertaining a dynamic property of the detected object, the ascertained dynamic property of the detected object being compared to a predetermined reference value, and it being determined, based on the comparison, whether the detected elevated object is real.

This yields the technical advantage, for example, that it may be efficiently determined whether the detected elevated object is real, since common objects within a parking facility generally have certain dynamic properties.

Examples of a dynamic property are a speed, an acceleration, and a movement direction.

For example, multiple dynamic properties are ascertained in each case. Statements made in conjunction with one dynamic property similarly apply for multiple dynamic properties, and vice versa.

In one specific embodiment, it is provided that, based on the classification, an object-specific speed threshold value is predefined as the object speed threshold value for the comparison.

This yields the technical advantage, for example, that the determination of whether the detected object is real may be carried out for a specific object.

In one specific embodiment, it is provided that, based on the classification, an object-specific reference value is predefined for the comparison with the ascertained dynamic property.

This yields the technical advantage, for example, that the determination of whether the detected object is real may be carried out for a specific object.

In one specific embodiment, it is provided that it is ascertained whether the ascertained movement is plausible for the classified object.

This yields the technical advantage, for example, that the determination of whether the detected object is real may be carried out for a specific object.

This specific embodiment is based on the finding that different objects move differently. A person generally moves differently than a motor vehicle. For example, a person can turn on the spot, which is generally not possible for a motor vehicle. Thus, persons have, for example, different movement profiles than motor vehicles.

With this knowledge, it may thus be advantageously and efficiently checked whether the ascertained movement during detection of an elevated object in video images that are recorded in chronological succession may still be associated with the same type of object.

An elevated object cannot be a motor vehicle one time and a pedestrian at a later time.

A detected elevated object is classified, for example, in one of the following classes of object types: motor vehicle, pedestrian, cyclist, animal, baby stroller, other.

In one specific embodiment, it is provided that when the detected elevated object is not real, one or more of the following actions is/are controlled: stopping all driverless motor vehicles traveling within the parking facility, summoning a service person to the video cameras, carrying out a function check of the video cameras, adjusting a particular setpoint trajectory to be driven along by driverless motor vehicles traveling within the parking facility, in order to bypass a section of the parking facility that encompasses the overlap area, blocking a section of the parking facility that encompasses the overlap area, blocking a story of the parking facility that encompasses the overlap area, transmitting an error message to an operator via a communications network.

This yields the technical advantage, for example, that safety for the parking facility may be efficiently enhanced.

According to one specific embodiment, it is provided that at least n video cameras are used, where n is greater than or equal to 3, an object being detected when, based on the comparison, it is ascertained that one overlap area already differs from the other recorded overlap areas, or that at least m overlap areas differ from the other overlap areas, where m is greater than 1 and less than n, or that all n overlap areas differ from one another. The more cameras that are used and the more overlap areas that are to differ, the more accurately the concept according to the present invention, i.e., in particular the method according to the present invention, may demarcate the "footprint" of the elevated object.

According to one specific embodiment, it is provided that the overlap area relative to at least one video camera is illuminated differently compared to the other video cameras.

This yields the technical advantage, for example, that an object may be efficiently detected. This is due to the fact that if one side of the object is illuminated preferentially or differently than other sides of the object, differences in the recorded video images may be recognized in a particularly easy and efficient manner.

That the overlap area relative to at least one video camera is illuminated differently compared to the other video camera means, for example, that a light source that illuminates the overlap area from the direction of the at least one video camera is situated within the parking facility. There is no illumination from the directions of the other video cameras, for example; i.e., no additional light sources are provided, or different illuminations are provided, for example light sources that are operated at different light intensities.

According to one specific embodiment, it is provided that the overlap area encompasses a travel area for motor vehicles.

This yields the technical advantage, for example, that the travel area may be efficiently monitored.

According to one specific embodiment, it is provided that the comparison encompasses comparing a particular brightness of the rectified video images in order to recognize differences in brightness as a difference.

This yields in particular the technical advantage that differences in the recorded overlap areas may be efficiently recognized.

According to one specific embodiment, it is provided that the parking facility is configured or designed for executing or carrying out the method for detecting an elevated object situated within a parking facility.

According to one specific embodiment, it is provided that the method for detecting an elevated object situated within a parking facility is executed or carried out with the aid of the system for detecting an elevated object situated within a parking facility.

Technical functionalities of the system result analogously from corresponding technical functionalities of the method, and vice versa.

This means in particular that system features result from corresponding method features, and vice versa.

According to one specific embodiment, it is provided that at least n video cameras are provided, where n is greater than or equal to 3.

According to one specific embodiment, it is provided that one or multiple or all of the following steps is/are carried out with the aid of a data processing device: step b), step c), ascertaining a result of whether an elevated object has been detected in the recorded video images, detecting an elevated object in the recorded video images, determining whether the detected elevated object is real, rectifying the recorded video images, comparing the particular rectified video images to one another to recognize a difference in the recorded overlap areas, detecting an elevated object based on the comparison. This means in particular that according to one specific embodiment, a data processing device is provided that is designed for carrying out one or multiple or all of the steps described above.

The data processing device includes, for example, one or multiple processors that are encompassed, for example, by at least one of the following elements: video camera or video cameras and/or a processing unit that is different from the video cameras.

In one specific embodiment, it is provided that at least one of the above steps carried out in conjunction with the data processing device is carried out with the aid of at least one of the video cameras and/or with the aid of a processing unit that is different from the video cameras.

This yields the technical advantage, for example, that redundancy is efficiently provided by the processing unit. When the video camera carries out the steps in question, this yields the technical advantage, for example, that the video camera is efficiently utilized.

According to one specific embodiment, an illumination device is provided. The illumination device is designed for illuminating the overlap area relative to at least one video camera differently compared to the other video cameras.

The illumination device encompasses, for example, one or multiple light sources that are spatially distributed within the parking facility. The light sources are situated in such a way, for example, that the overlap area is illuminated differently from different directions.

In one specific embodiment, it is provided that the overlap area is illuminated in the manner of a spotlight from a preferred direction, for example with the aid of the illumination device.

In one specific embodiment, it is provided that the overlap area is illuminated from a single direction.

The light sources are situated, for example, on a ceiling and/or on a pillar and/or on a wall, generally on an infrastructure element of the parking facility.

According to one specific embodiment, it is provided that at least n video cameras are used, where n is greater than or equal to 3.

According to one specific embodiment, it is provided that a particular overlap area is monitored by exactly three or exactly four video cameras, whose visual ranges overlap in the particular overlap area.

In one specific embodiment, it is provided that multiple video cameras are provided, whose visual ranges overlap in an overlap area. This means in particular that multiple overlap areas are detected, in particular monitored, here with the aid of multiple video cameras.

The phrase "respective" encompasses in particular the phrase "and/or."

"Not real" means unreal.

According to one specific embodiment, it is provided that one or multiple or all video cameras is/are situated at a height of at least 2 m, in particular 2.5 m, relative to a floor of the parking facility.

This yields the technical advantage, for example, that the overlap area may be efficiently recorded.

The present invention is explained in greater detail below with reference to preferred exemplary embodiments.

DETAILED DESCRIPTION OF EXAMPLE EMBODIMENTS

The same reference numerals may be used for identical features in the following discussion.

Figure 1:
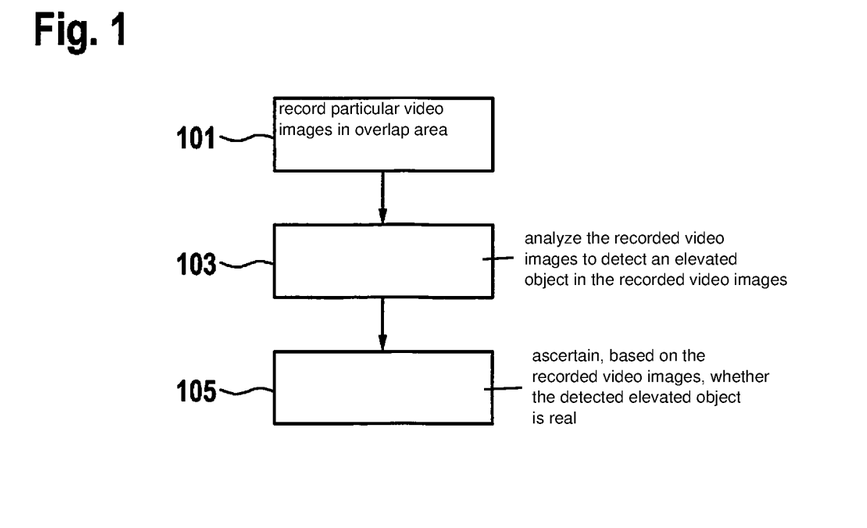
FIG. 1 shows a flow chart of a method for detecting an elevated object situated within a parking facility.

FIG. 1 shows a flow chart of a method for detecting an elevated object situated within a parking facility, using at least two video cameras that are spatially distributed within the parking facility, and whose visual ranges overlap in an overlap area.

The method encompasses the following steps:
recording 101 particular video images of the overlap area with the aid of the video cameras,
analyzing 103 the recorded video images in order to detect an elevated object in the recorded video images,
ascertaining 105, based on the recorded video images, whether in the detection of an elevated object the detected elevated object is real.

Step 103 and/or step 105 encompass(es), for example, the following steps:
rectifying the recorded video images,
comparing the particular rectified video images to one another in order to recognize a difference in the recorded overlap areas,
detecting an elevated object based on the comparison.

The step of rectifying encompasses in particular transforming the recorded video images into the bird's-eye view. This yields in particular the technical advantage that the video images may subsequently be efficiently compared.

For example, if ascertainment 105 shows that the detected object is not real, i.e., is unreal, it is provided, for example, that one or more of the above-described actions is/are controlled.

A detected elevated object may be classified as follows, for example: motor vehicle, pedestrian, cyclist, animal, baby stroller, other.

Figure 2:
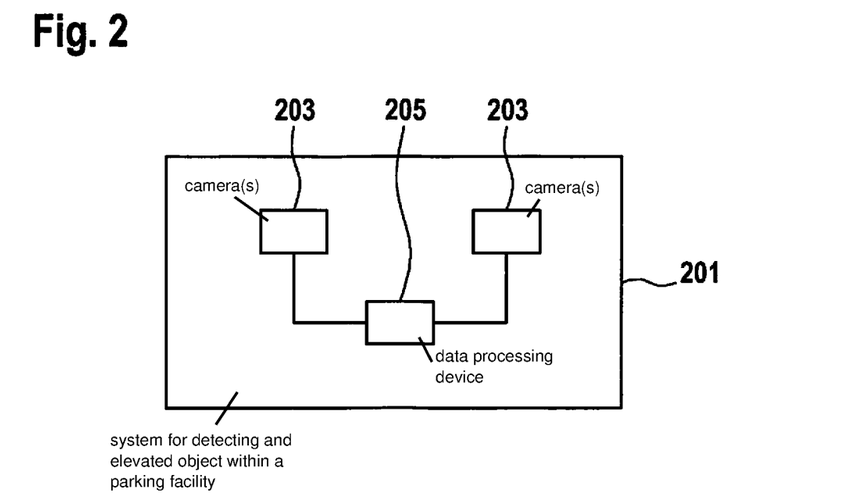
FIG. 2 shows a system for detecting an elevated object situated within a parking facility.

FIG. 2 shows a system 201 for detecting an elevated object situated within a parking facility. System 201 is designed for executing or carrying out the method for detecting an elevated object situated within a parking facility.

System 201 encompasses, for example:
at least two video cameras 203 that are spatially distributed within the parking facility and whose visual ranges overlap in an overlap area in order to record a particular video image of the overlap area, and
a data processing device 205 that is designed for carrying out one or more of the following steps: step b), step c), ascertaining a result of whether an elevated object has been detected in the recorded video images, detecting an elevated object in the recorded video images, determining whether the detected elevated object is real, rectifying the recorded video images, comparing the particular rectified video images to one another to recognize a difference in the recorded overlap areas, detecting an elevated object based on the comparison.

Figure 3:
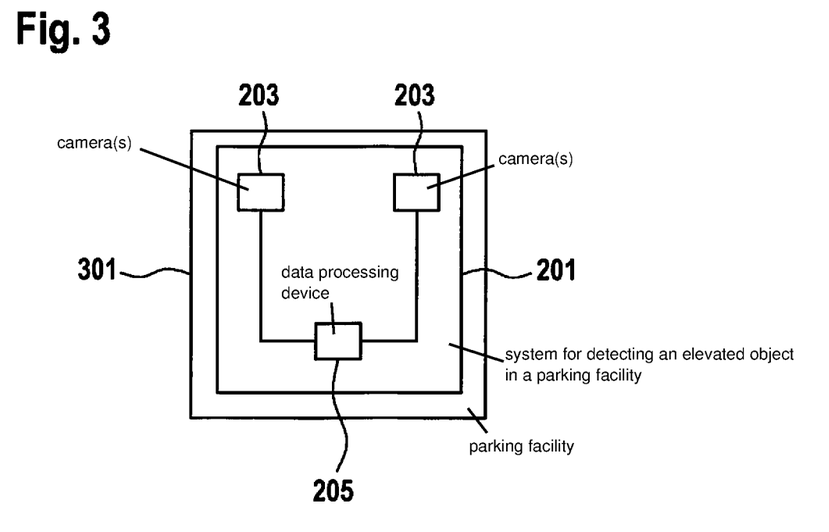
FIG. 3 shows a parking facility.

FIG. 3 shows a parking facility 301.

Parking facility 301 encompasses system 201 of FIG. 2.

Figure 4:
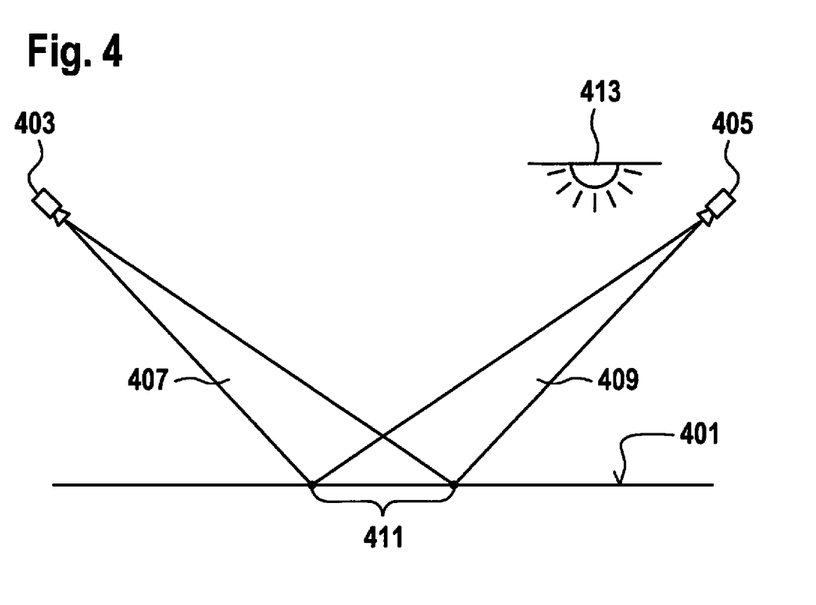
FIG. 4 shows two video cameras that monitor a floor of a parking facility.

FIG. 4 shows a first video camera 403 and a second video camera 405 that monitor a floor 401 of a parking facility. The two video cameras 403, 405 are situated on a ceiling, for example (not shown).

First video camera 403 has a first visual range 407. Second video camera 405 has a second visual range 409. The two video cameras 403, 405 are situated in such a way that the two visual ranges 407, 409 overlap in an overlap area 411. This overlap area 411 is part of floor 401.

Situated directly to the left of second video camera 405 is a light source 413 that illuminates overlap area 411 from the direction of second video camera 405.

No elevated object is situated on floor 401. This means that both video cameras 403, 405 view or detect the same overlap area 411. This means that the two video cameras 403, 405 recognize or view the same image information of overlap area 411.

The two video cameras 403, 405 each record video images of overlap area 411, and the video images are rectified. If no elevated object is situated between overlap area 411 and video camera 403 and 405, the particular rectified video images do not differ from one another, at least not within a predefined tolerance (the predetermined tolerance value). In this case, no difference is recognized, so that also no elevated object is detected.

Overlap area 411 is situated, for example, on a travel area of the parking facility. This means, for example, that motor vehicles may travel on overlap area 411.

Figure 5:
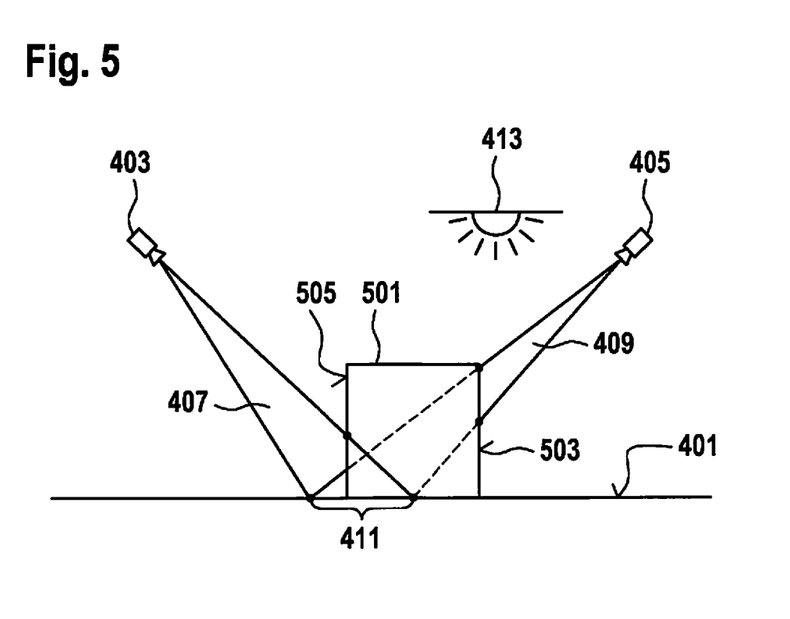
FIG. 5 shows the two video cameras of FIG. 4 during the detection of an elevated object.

FIG. 5 shows the two video cameras 403, 405 during the detection of an elevated object 501. Elevated object 501 has oppositely situated sides 503, 505: Side 503 is referred to below as the right side (relative to the plane of the drawing). Side 505 is referred to below as the left side (relative to the plane of the drawing).

Elevated objects generally look different from different sides. This means that elevated object 501 looks different from right side 503 than from left side 505.

Elevated object 501 is situated on floor 401. Elevated object 501 is situated between overlap area 411 and the two video cameras 403, 405.

First video camera 403 detects left side 505 of elevated object 501. Second video camera 405 detects right side 503 of elevated object 501.

In this case, the particular rectified video images differ from one another, so that a difference may be recognized. Elevated object 501 is then detected. In this case, the differences are greater than the predetermined tolerance value.

In particular as the result of providing light source 413, right side 503 is illuminated more intensely than left side 505. This yields the technical advantage, for example, that the brightnesses of the recorded, and thus also rectified, video images differ. Differences in brightness may be efficiently detected, so that the difference may be efficiently recognized so that elevated object 501 may advantageously be efficiently detected.

Elevated object 501 is, for example, a motor vehicle that is traveling on floor 401 of the parking facility. Sides 503, 505 are, for example, front and rear sides, or the right and left sides, of the motor vehicle.

If a nonelevated, i.e., two-dimensional or flat, object is situated on floor 401, the correspondingly rectified video images generally do not differ from one another within a predefined tolerance. Such a two-dimensional object is a newspaper, a piece of paper, or leaves, for example. The fact that in such a case, although an object, even if it is not an elevated object, is situated on floor 401 and is possibly not detected in the rectified video images due to the lack of a difference (differences are less than or less than or equal to the predefined tolerance value), in this regard is not relevant here for safety reasons, since motor vehicles may generally travel over such nonelevated objects. Motor vehicles may travel over leaves or paper without resulting in a hazardous situation or collision, in contrast to an elevated object, which may be a pedestrian, a cyclist, an animal, or a motor vehicle, for example. A motor vehicle should not collide with such objects.

Video images are recorded with the aid of video cameras 403, 405 and evaluated, i.e., analyzed, in order to detect an elevated object in the video images.

If an elevated object is detected in the recorded video images, it is provided, for example, that video images that are recorded subsequent to these video images with the aid of video cameras 403, 405 are similarly analyzed in order to verify in these subsequently recorded video images the object detected in the earlier images.

If the initially detected object is not redetected in the subsequently recorded video images, it is determined, for example, that the initially detected object is not real.

If the initially detected elevated object is detected in the subsequently recorded video images, it is provided, for example, that an object speed is ascertained and/or that the initially detected object as well as the redetected object are classified.

If, for example, the ascertained object speed is greater than a predetermined object speed threshold value, it is determined that the detected elevated object is not real.

If, for example, the two classifications differ, it is determined that the detected elevated object is not real.

For example, one or multiple criteria is/are provided which, when met, result in an object being detected in the video images.

One criterion, for example, is that a different rectified video image from a single video camera is already sufficient, for example, to detect an elevated object, regardless of whether the other video cameras record the same or different video images.

Another criterion, for example, is that all video cameras must record a different video image in order to detect an elevated object.

Another criterion, for example, is that for n video cameras, where n is greater than or equal to 3, m video cameras must each record a different video image, where m is greater than 1 and less than n, in order to detect an elevated object, regardless of whether the other video cameras record the same or different video images.

The information that an object has been detected is reported or transmitted, for example, to a parking facility management system. The parking facility management system uses this information, for example, for planning or managing an operation of the parking facility. The parking facility management system thus operates, for example, the parking facility based on the information.

This information is used, for example, for remote control of a motor vehicle situated within the parking facility. This means, for example, that the parking facility management system remotely controls a motor vehicle within the parking facility, based on the detected object(s).

This information is transmitted, for example, to motor vehicles autonomously driving within the parking facility via a wireless communications network.

The present invention is thus based in particular on analyzing in each case video images recorded in chronological succession with the aid of video cameras, and when an object is detected, tracking the detected elevated object over time to ascertain whether the detected object is real. The video cameras are spatially distributed within a parking facility, which may be designed as a parking deck or as a parking garage, for example, in such a way that, for example, each point of a travel area is viewed or detected and/or monitored by at least two, for example at least three, video cameras. This means that the particular visual ranges overlap in overlap areas in each case, the overlap areas covering the travel area. The recorded video images are rectified, for example prior to the comparison.

The corresponding rectified video images of the video cameras are compared to one another. For example, it is provided that if all video cameras in the travel area view the same image information at a certain location or at a certain point, it is determined that no object is situated on the particular line of sight between the certain location and the video cameras. In this regard, an object is not detected either. However, for example if the image information of one video camera at this location differs from the other video cameras, it is thus clear that an elevated object must be situated on the line of sight of this one video camera. In this regard, an elevated object is detected.

Video images chronologically following these rectified video images are analyzed similarly as for these earlier rectified video images, i.e., in particular rectified and compared to one another. The result of this comparison is used in particular to determine whether, during detection of an object based on the earlier video images, the detected elevated object in question is real.

Within the meaning of this description, the phrases "same image information" and "identical image information" in particular also encompass the case that the pieces of image information differ maximally by a predetermined tolerance value. Only differences that are greater than the predetermined tolerance value result in detection of an object. This means in particular that small differences in the brightness information and/or color information are allowed in order to draw the conclusion that the pieces of image information are the same or identical, provided that the differences are smaller than the predetermined tolerance value.

This means in particular, for example, that a tolerance is predefined, about which the rectified video images are allowed to differ without an elevated object being detected. Only when the differences are greater than the predefined tolerance is an elevated object detected.

According to one specific embodiment, this means in particular that an object is detected only when the differences in the rectified video images are greater than a predefined tolerance or a predetermined tolerance value.

For example, it is provided that a motor vehicle that is driving autonomously or by remote control moves within the parking facility on predefined surfaces, the travel area. The video cameras are situated in such a way, for example, that their visual ranges overlap in the travel area. This overlap is selected in such a way that each point on the periphery (floor, wall, for example) in the travel area is viewed or monitored by at least three video cameras. In particular, the arrangement is selected in such a way that each point on the periphery is viewed or monitored from a different perspective.

This means in particular that the overlap area is detected and recorded from different directions with the aid of the video cameras.

From each individual point of the periphery, the lines of sight to, for example, the three video cameras that view this point may be traced. If more video cameras are to be available, it is provided, for example, that of the multiple cameras, three video cameras with preferably different perspectives are selected.

If no elevated object is situated on the lines of sight of the video cameras at this point, all video cameras view the same piece(s) of image information (see FIG. 4), which differ maximally by a predetermined tolerance value.

For example, if a brightness or a color of the surface of the floor changes, for example if the floor is wet due to the introduction of moisture, this does not interfere with a detection of the periphery, provided that all video cameras view the same changed brightness or color. For example, if a two-dimensional object, such as a newspaper, piece of paper, or leaves, is situated on the floor, according to the concept according to the present invention this nonelevated object is generally not detected, since all video cameras view the same piece(s) of image information that differ(s) maximally by a predetermined tolerance value. This is not critical for safety reasons, since such two-dimensional objects may be easily traveled over by motor vehicles.

If an elevated object is situated in the travel area (see FIG. 5, for example), the lines of sight of the video cameras no longer strike the periphery (overlap area) as expected, and instead see different views of the elevated object and therefore record different video images.

An elevated object is a person or a motor vehicle, for example.

For example, one video camera thus views the front side of the object, while the other video camera views the rear side of the object. The two sides generally differ significantly, and the elevated object may thus be detected if the recorded video images are different. This effect may be intensified, for example, by a brighter illumination of the scene, i.e., the overlap area, on one side, so that failure to notice elevated objects may be efficiently ruled out. Due to a different illumination of the various sides of an object, this object appears brighter on the more intensely illuminated side than on the weakly illuminated side, so that the video cameras view different pieces of image information. This applies even for monochrome objects.

The present invention (spatial distribution of the video cameras with a corresponding overlap area, illuminating the scene by way of example, and tracking a detected elevated object over time) advantageously allows efficient determination of whether a detected elevated object is actually real, so that ultimately, elevated objects may be efficiently detected or recognized. The concept according to the present invention is in particular very robust against changes in brightness or changes in brightness at specific points, for example due to solar radiation.

The information that an elevated object is detected may be transferred, for example, to a higher-order control system. This control system may, for example, stop a remote-controlled motor vehicle or transmit a stop signal to an autonomously driving motor vehicle, so that these motor vehicles can still stop in time in front of the elevated object. The control system is encompassed by the parking facility management system, for example.

The present invention may also be advantageously used in the AVP field. "AVP" stands for "automated valet parking" and may also be referred to as "automatic parking operation." Within the scope of such an AVP operation, it is provided in particular that motor vehicles are automatically parked within a parking facility, and after the end of a parking period are automatically driven from their parking position to a pick-up position, at which the motor vehicle may be picked up by its owner.

What is claimed is:

1. A method for detecting an elevated object situated within a parking facility, using at least two video cameras that are spatially distributed within the parking facility and whose visual ranges overlap in an overlap area, the method comprising:
   a) recording particular video images of the overlap area using the video cameras, wherein the video images of the at least two video cameras are recorded in chronological succession to determine whether or not a detected elevated object is real;
   b) analyzing the recorded video images to detect the elevated object in the recorded video images; and c) ascertaining, based on the recorded video images, whether in the detection of the elevated object the detected elevated object is real, and at which location in the video images, the detected elevated object moves into the particular video image and/or moves out of the particular video image, wherein it is determined that the detected elevated object is real when the detected object moves into the particular video image at an edge of the video image, and/or moves out of the particular video image at the edge of the video image, and it is determined that the detected elevated object is not real when the detected object appears within the video image or disappears within the video image without having crossed the edge of the video image;
wherein for detecting the elevated object in the recorded video images, the following steps are provided according to the analysis according to step b):
rectifying the recorded video images by at least transforming the recorded video images into a bird's-eye view;
comparing the particular rectified video images to one another in order to recognize a difference in the recorded overlap areas; and
detecting the elevated object based on the comparison.

2. The method as recited in claim 1, wherein step c) includes ascertaining an object speed, the ascertained object speed being compared to a predetermined object speed threshold value, and based on the comparison, determining whether the detected elevated object is real.

3. The method as recited in claim 1, wherein step c) includes ascertaining a movement of the detected elevated object, it being ascertained whether the movement of the detected elevated object is plausible, and based on the plausibility check, determining whether the detected elevated object is real.

4. The method as recited in claim 3, wherein it is ascertained whether the ascertained movement is plausible for the classified object.

5. The method as recited in claim 1, wherein step c) includes classifying the detected elevated object, it being determined, based on the classification, whether the detected elevated object is real.

6. The method as recited in claim 5, wherein step c) includes ascertaining an object speed, the ascertained object speed being compared to a predetermined object speed threshold value, and based on the comparison, determining whether the detected elevated object is real, and wherein based on the classification, an object-specific speed threshold value is predefined as the predetermined object speed threshold value for the comparison.

7. The method as recited in claim 1, wherein when the detected elevated object is not real, one or more of the following actions is/are controlled: stopping all driverless motor vehicles traveling within the parking facility, summoning a service person to the video cameras, carrying out a function check of the video cameras, adjusting a particular setpoint trajectory to be driven along by driverless motor vehicles traveling within the parking facility to bypass a section of the parking facility that encompasses the overlap area, blocking a section of the parking facility that encompasses the overlap area, blocking a story of the parking facility that encompasses the overlap area, transmitting an error message to an operator via a communications network.

8. The method as recited in claim 1, wherein the overlap area encompasses a travel area for motor vehicles.

9. A system for detecting an elevated object situated within a parking facility, the system including at least two video cameras that are spatially distributed within the parking facility and whose visual ranges overlap in an overlap area, the system configured to:
a) record particular video images of the overlap area using the video cameras, wherein the video images of the at least two video cameras are recorded in chronological succession to determine whether or not a detected elevated object is real;
b) analyze the recorded video images to detect the elevated object in the recorded video images; and
c) ascertain, based on the recorded video images, whether in the detection of an elevated object the detected elevated object is real, and at which location in the video images, the detected elevated object moves into the particular video image and/or moves out of the particular video image, wherein it is determined that the detected elevated object is real when the detected object moves into the particular video image at an edge of the video image, and/or moves out of the particular video image at the edge of the video image, and it is determined that the detected elevated object is not real when the detected object appears within the video image or disappears within the video image without having crossed the edge of the video image;
wherein for detecting the elevated object in the recorded video images, the following steps are provided according to the analysis according to step b):
rectifying the recorded video images by at least transforming the recorded video images into a bird's-eye view;
comparing the particular rectified video images to one another in order to recognize a difference in the recorded overlap areas; and
detecting the elevated object based on the comparison.

10. A parking facility that includes a system for detecting an elevated object situated within the parking facility, the system including at least two video cameras that are spatially distributed within the parking facility and whose visual ranges overlap in an overlap area, the system configured to:
a) record particular video images of the overlap area using the video cameras, wherein the video images of the at least two video cameras are recorded in chronological succession to determine whether or not a detected elevated object is real;
b) analyze the recorded video images to detect the elevated object in the recorded video images; and
c) ascertain, based on the recorded video images, whether in the detection of the elevated object the detected elevated object is real, and at which location in the video images, the detected elevated object moves into the particular video image and/or moves out of the particular video image, wherein it is determined that the detected elevated object is real when the detected object moves into the particular video image at an edge of the video image, and/or moves out of the particular video image at the edge of the video image, and it is determined that the detected elevated object is not real when the detected object appears within the video image or disappears within the video image without having crossed the edge of the video image;
wherein for detecting the elevated object in the recorded video images, the following steps are provided according to the analysis according to step b):
rectifying the recorded video images by at least transforming the recorded video images into a bird's-eye view;

comparing the particular rectified video images to one another in order to recognize a difference in the recorded overlap areas; and detecting the elevated object based on the comparison.

11. A non-transitory computer readable storage medium on which is stored a computer program that includes program code for detecting an elevated object situated within a parking facility, using at least two video cameras that are spatially distributed within the parking facility and whose visual ranges overlap in an overlap area, the computer program, when executed by a computer, causing the computer to perform:
- a) recording particular video images of the overlap area using the video cameras, wherein the video images of the at least two video cameras are recorded in chronological succession to determine whether or not a detected elevated object is real;
- b) analyzing the recorded video images to detect the elevated object in the recorded video images; and
- c) ascertaining, based on the recorded video images, whether in the detection of the elevated object the detected elevated object is real, and at which location in the video images, the detected elevated object moves into the particular video image and/or moves out of the particular video image, wherein it is determined that the detected elevated object is real when the detected object moves into the particular video image at an edge of the video image, and/or moves out of the particular video image at the edge of the video image, and it is determined that the detected elevated object is not real when the detected object appears within the video image or disappears within the video image without having crossed the edge of the video image;

wherein for detecting the elevated object in the recorded video images, the following steps are provided according to the analysis according to step b):

rectifying the recorded video images by at least transforming the recorded video images into a bird's-eye view;

comparing the particular rectified video images to one another in order to recognize a difference in the recorded overlap areas; and detecting the elevated object based on the comparison.

* * * * *